United States Patent
Kiemele

(10) Patent No.: US 10,307,828 B2
(45) Date of Patent: Jun. 4, 2019

(54) CUTTING INSERT GEOMETRY

(71) Applicant: CeramTec GmbH, Plochingen (DE)

(72) Inventor: Alexander Kiemele, Eybach (DE)

(73) Assignee: CERAMTEC GMBH, Plochingen (DE)

( * ) Notice: Subject to any disclaimer, the term of this patent is extended or adjusted under 35 U.S.C. 154(b) by 60 days.

(21) Appl. No.: 15/532,926

(22) PCT Filed: Dec. 4, 2015

(86) PCT No.: PCT/EP2015/078611
§ 371 (c)(1),
(2) Date: Jun. 2, 2017

(87) PCT Pub. No.: WO2016/087628
PCT Pub. Date: Jun. 9, 2016

(65) Prior Publication Data
US 2017/0341154 A1    Nov. 30, 2017

(30) Foreign Application Priority Data
Dec. 5, 2014   (DE) .......................... 10 2014 225 035

(51) Int. Cl.
*B23B 27/14*   (2006.01)

(52) U.S. Cl.
CPC ...... *B23B 27/145* (2013.01); *B23B 2200/049* (2013.01); *B23B 2200/088* (2013.01);
(Continued)

(58) Field of Classification Search
CPC .......... B23B 2226/18; B23B 2200/049; B23B 2200/088; B23B 2200/201; B23B 2200/242; B23B 27/145
See application file for complete search history.

(56) References Cited

U.S. PATENT DOCUMENTS 4,318,318 A * 3/1982 Schott ................... B23B 27/143
407/113
4,480,950 A * 11/1984 Kraft ................... B23B 27/1651
407/103
(Continued)

FOREIGN PATENT DOCUMENTS

DE    2814621 A1    10/1979
EP    1 536 903 B1    2/2007
(Continued)

OTHER PUBLICATIONS

International Search Report for PCT/EP2015/078611 dated Feb. 16, 2016; English translation submitted herewith (7 Pages).
(Continued)

*Primary Examiner* — Sara Addisu
(74) *Attorney, Agent, or Firm* — Fitch, Even, Tabin & Flannery, LLP

(57) ABSTRACT

The invention relates to a cutting insert (1) for installation in carrier tools for machining workpieces, comprising a top side (2), a bottom side (3), and side surfaces (4) connecting the top side (2) and the bottom side (3), wherein a peripheral protective chamfer (5) having an upper edge (6) adjoining the top side (2) of the cutting insert (1) and having a lower edge (7) adjoining the side surfaces (4) is arranged at the transition from the top side (2) to the side surfaces (4), wherein the upper edge (6) forms cutting edges (9) and cutting corners (10) and, in the region of the cutting edges (9), the lower edge (7) transitions into a cutting-edge clearance angle surface (8) having an edge clearance angle of 3° to 11°. For improved edge stability in drawn cuts, it is proposed that, in the region of the cutting corners (10), the lower edge (7) of the protective chamfer (5) transitions into a corner clearance angle surface (11) having an edge clearance angle of 3° to 5°.

14 Claims, 1 Drawing Sheet

(52) U.S. Cl.
CPC ... *B23B 2200/201* (2013.01); *B23B 2200/242* (2013.01); *B23B 2226/18* (2013.01)

(56) References Cited

U.S. PATENT DOCUMENTS

| | | | | |
|---|---|---|---|---|
| 5,246,315 | A * | 9/1993 | Hansson | B23B 5/12 407/114 |
| 5,634,745 | A * | 6/1997 | Wiman | B23B 27/141 407/113 |
| 5,771,763 | A * | 6/1998 | Naslund | B23B 27/145 407/113 |
| 5,820,311 | A * | 10/1998 | Grun | B23B 27/1677 407/102 |
| 5,836,723 | A * | 11/1998 | Von Haas | B23B 27/04 407/107 |
| 5,904,450 | A * | 5/1999 | Satran | B23C 5/202 407/113 |
| 6,017,172 | A * | 1/2000 | Ukegawa | B23B 27/1651 407/113 |
| 6,527,486 | B2 * | 3/2003 | Wiman | B23B 27/141 407/113 |
| 6,623,217 | B2 * | 9/2003 | Brockett | B23B 27/141 407/114 |
| 7,195,427 | B2 * | 3/2007 | Sjoo | B23B 27/1651 407/111 |
| 8,454,279 | B2 * | 6/2013 | Dufour | B23C 5/207 407/113 |
| 9,289,830 | B2 * | 3/2016 | Ben Amor | B23B 27/1651 |
| 9,486,857 | B2 * | 11/2016 | Stemmer | B23B 27/141 |
| 2003/0086766 | A1 * | 5/2003 | Andras | B23B 27/1651 407/102 |
| 2003/0180109 | A1 * | 9/2003 | Leuze | B23B 27/145 408/227 |
| 2004/0256608 | A1 * | 12/2004 | Eder | B23B 27/1629 254/401 |
| 2005/0186039 | A1 * | 8/2005 | Muller | B23B 27/164 407/113 |
| 2006/0188347 | A1 * | 8/2006 | Kratz | B23B 27/145 407/113 |
| 2006/0228179 | A1 * | 10/2006 | Alm | B23B 27/145 407/113 |
| 2007/0056413 | A1 * | 3/2007 | Krenzer | B23B 27/141 82/1.11 |
| 2008/0075547 | A1 | 3/2008 | Wolf et al. | |
| 2008/0181739 | A1 * | 7/2008 | Chang | B23B 27/007 408/212 |
| 2008/0286558 | A1 | 11/2008 | Kukino et al. | |
| 2010/0266353 | A1 * | 10/2010 | Zitzlaff | B23B 27/145 407/113 |
| 2011/0229279 | A1 * | 9/2011 | Kobayashi | B23B 27/143 407/115 |
| 2012/0282048 | A1 * | 11/2012 | Kountanya | B23B 27/145 407/113 |
| 2013/0022422 | A1 * | 1/2013 | Ramesh | B23B 51/048 408/200 |
| 2013/0022423 | A1 * | 1/2013 | Ramesh | B23B 51/048 408/200 |
| 2013/0051941 | A1 * | 2/2013 | Ben Amor | B23B 27/164 407/64 |
| 2013/0315684 | A1 * | 11/2013 | Ramesh | B23B 27/145 408/231 |
| 2014/0286719 | A1 * | 9/2014 | Ramesh | B23B 51/048 408/199 |
| 2015/0139744 | A1 * | 5/2015 | Harif | B23B 51/02 407/69 |
| 2016/0082518 | A1 * | 3/2016 | Sakai | B23B 27/143 82/1.11 |
| 2017/0028481 | A1 * | 2/2017 | Sato | B23B 51/048 |
| 2017/0165757 | A1 * | 6/2017 | Goldsmith | B23B 27/145 |

FOREIGN PATENT DOCUMENTS

| | | | |
|---|---|---|---|
| EP | 1 414 607 B1 | 4/2008 | |
| EP | 2260960 A1 * | 12/2010 | ........... B23B 27/141 |
| WO | WO 9620802 A1 * | 7/1996 | ........... B23B 27/141 |
| WO | 03/013770 A1 | 2/2003 | |

OTHER PUBLICATIONS

Office Action and Search Report (with English translation) of CN Appln. No. 201580066211.8 dated Aug. 2, 2018.

* cited by examiner

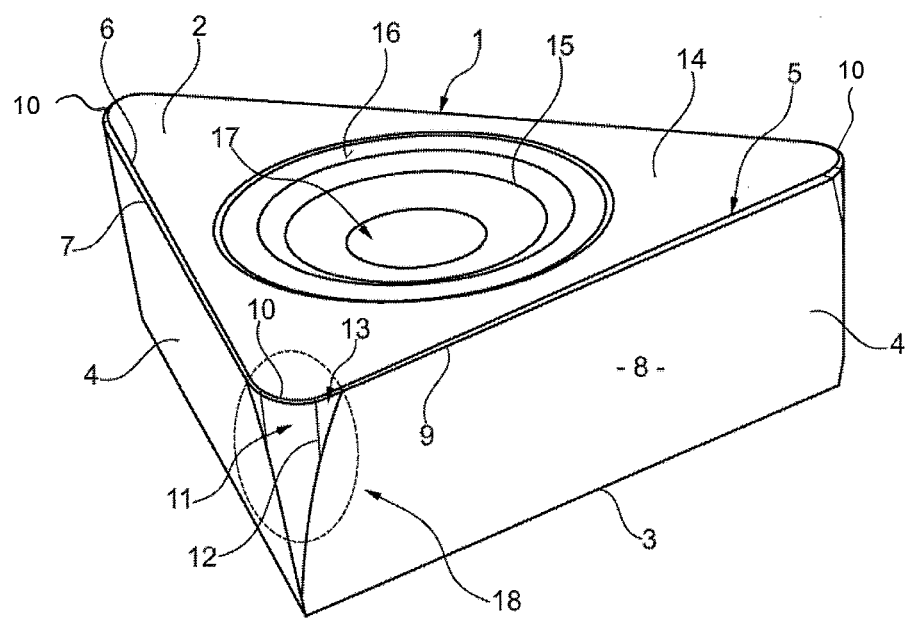

CUTTING INSERT GEOMETRY

CROSS-REFERENCE TO RELATED APPLICATIONS

This application is a U.S. national phase application filed under 35 U.S.C. § 371 of International Application No. PCT/EP2015/078611, filed Dec. 4, 2015, designating the United States, which claims priority from German Patent Application No. 102014225035.8, filed Dec. 5, 2014, which are hereby incorporated herein by reference in their entirety for all purposes.

The invention relates to a cutting insert for installation in carrier tools for machining workpieces, comprising a top side, a bottom side, and side surfaces connecting the top side and the bottom side, wherein a peripheral protective chamfer having an upper edge adjoining the top side of the cutting insert and having a lower edge adjoining the side surfaces is arranged at the transition from the top side to the side surfaces, wherein the upper edge forms cutting edges and cutting corners and, in the region of the cutting edges, the lower edge transitions into a cutting-edge clearance angle surface having an edge clearance angle of 3° to 11°.

Such cutting inserts are known according to the ISO standard (Aug. 14, 2015 version) for edge clearance angles of 3°, 5°, 7° or 11°. The edge clearance angle is always formed peripherally, with or without a trailing cutting edge (colloquially also called a wiper).

In drawn cuts, the material is removed by lateral travel with a small setting angle. Because of the "sharp blade", there is low edge stability.

The problem addressed by the invention is that of further developing a cutting insert according to the preamble of claim 1 in such a way that the edge stability is improved in drawn cuts.

According to the invention, this problem is solved in that, in the region of the cutting corners, the lower edge of the protective chamfer transitions into a corner clearance angle surface having an edge clearance angle of 3° to 5°. As a result, the service life of the cutting insert is considerably improved, because a stable edge can better absorb the cutting pressure that occurs and thus the cutting insert has a lesser tendency toward micro-chipping at the blade, which in the end impairs the performance. The cutting insert is preferably composed of PCBN or a CBN composite material but can also be composed of, for example, an oxide ceramic, nitride ceramic, or mixed ceramic. The cutting insert can be solid, face-laminated, or edge- or corner-tipped.

The corner radius lies between 0.2 and 3.2 mm, preferably lies between 0.4 and 1.2 mm, and extremely preferably is 0.8 mm. The best results were achieved between 0.4 and 1.2 mm, especially at 0.8 mm.

In a preferred embodiment of the cutting insert, a trailing cutting edge, colloquially also called a wiper, is arranged between the corner clearance angle surface and the cutting-edge clearance angle surface, which trailing cutting edge adjoins the lower edge of the protective chamfer and the corner clearance angle surfaces and the cutting-edge clearance angle surfaces, wherein the length of the trailing cutting edge at the lower edge of the protective chamfer is between 0.2 and 1.0 mm, preferably is between 0.4 and 0.8 mm, and especially preferably is 0.5 mm. The length of the trailing cutting edge considerably determines the required surface of the workpiece and the feed rate that is possible in this regard.

The transition of the corner clearance angle surface to the trailing cutting edge can be designed as a radius transition or as a tangent between the corner radius and the cutting insert edge at the top side of the cutting insert.

In a preferred embodiment, the cutting insert has two to eight cutting corners, preferably three or four cutting corners, and extremely preferably three cutting corners.

In order that the cutting insert can be clamped in a tool holder, a circular clamping recess is preferably arranged on the top side, i.e., the rake face, which clamping recess has a spherical or circular elevation in the center, the tip of which lies below the rake face. The best anchoring can be achieved with such clamping recesses. Furthermore, the design of the cutting insert clamping can also correspond to the standard clamping types presented in the designation system of ISO 1832 (from Dec. 5, 2014).

In one embodiment, a second clamping recess is arranged coaxial to the first clamping recess, wherein the first clamping recess is arranged deeper than the second clamping recess and both clamping recesses are arranged deeper than the rake face. When this cutting insert is clamped in a tool, a clamping claw of the tool lies on the second clamping recess and engages in the first clamping recess, for example by means of a nose. The distance of the contact surface of the clamping claw from the recess is thus always constant and does not depend on lapping or grinding of the top side of the cutting insert.

The use of the cutting insert according to the invention to machine cast materials, composite materials, and steel materials is preferred.

The cutting insert according to the invention is thus distinguished by a new design of the cutting edge, by means of which the service life can be considerably improved, because a stable edge can better absorb the cutting pressure that occurs and there-fore has a lesser tendency toward chipping.

By means of a different design of the cutting insert periphery outside of the ISO standard range, the insert performance can be improved in the machining mentioned above.

The clamping of the cutting insert in the holder can be implemented as a clamping recess according to EP 1 414 607 B1 in combination with EP 1 536 903 B1 or within the framework of the ISO standard (ISO 1832 from Dec. 5, 2014) clamping devices.

In the presented embodiment, a recess described in WO 03/013770 A1 is created. The recess is circular and has a spherical or circular elevation in the center. The tip of the elevation preferably lies above the bottom of the recess and below the top side of the cutting insert. For clamping on a cutting tool, a clamping claw having an adapted shaped nose interlockingly engages in the recess of the cutting insert. Said recess is used for interlocking clamping on a carrier body. Especially for drawn cuts, in the case of which the cutting insert could be pulled from the seat of the cutting insert by the acting cutting forces or the contact in the insert seat is no longer ensured, said cutting insert having the special recess is advantageous. See also the cited document for further description of said recess.

In another embodiment according to the invention, the recess is designed as described in EP 1 536 903 B1 so that lapping or grinding of the top sides of the cutting inserts does not influence the clamping characteristics of the cutting insert. In this case, a first clamping recess for clamping into the cutting tool is created and a second clamping recess is arranged coaxial to the first clamping recess, wherein the first clamping recess is arranged deeper than the second clamping recess and both clamping recesses are arranged deeper than the top side of the cutting insert. When said cutting insert is clamped in a tool, a clamping claw of the tool lies on the second clamping recess and engages in the first clamping recess, for example by means of a nose. The distance of the contact surface of the clamping claw from the recess is thus always constant and does not depend on lapping or grinding of the top sides of the cutting inserts.

The advantage of the design according to the invention lies mainly in the "region having a smaller clearance angle". By means of said region, the cutting edge is stabilized and, in the machining strategy, the service life is increased despite the use of the same cutting material.

Because of the edge clearance angle in the range of 3° to 11°, the cutting insert can be used in the tool holders common in the market in the case of an implementation also including an ISO standard clamping device.

The cutting insert according to the invention is explained in greater detail in one figure.

FIG. 1 shows a cutting insert 1 according to the invention with a top side 2 and a bottom side 3 composed of a ceramic material, having three corners each having a corner radius 10. In this case, the corner radius 10 is 0.8 mm but otherwise lies between 0.2 and 3.2 mm. The sides 2, 3 are connected by means of peripheral surfaces 4. On the top side 2 of the cutting insert 1, there is a rake face 14, on which a first circular clamping recess 15 is arranged, which has a spherical or circular elevation 17 in the center, the tip of which lies below the rake face 14. Said clamping recess 15 is used for clamping on a cutting tool not shown here. A second clamping recess 16 is arranged coaxial to the first clamping recess 15, wherein the first clamping recess 15 is arranged deeper than the second clamping recess 16 and both clamping recesses 15, 16 are arranged deeper than the rake face 14. When said cutting insert 1 is clamped in a tool, a clamping claw of the tool lies on the second clamping recess and engages in the first clamping recess, for example by means of a nose. The distance of the contact surface of the clamping claw from the recess is thus always constant and does not depend on lapping or grinding of the top sides of the cutting inserts.

A peripheral protective chamfer 5 having an upper edge 6 adjoining the top side 2 of the cutting insert 1 and having a lower edge 7 adjoining the side surfaces 4 is arranged at the transition from the rake face 14 to the peripheral surface 4. The upper edge 6 of the protective chamfer 5 forms the cutting edge 9 and the cutting corners 10. In the region of the cutting edges 9, the lower edge 7 of the protective chamfer 5 transitions into a cutting-edge clearance angle surface 8 having an edge clearance angle of 3° to 11°. In the region of the cutting corners 10, the lower edge 7 of the protective chamfer 5 transitions into a corner clearance angle surface 11 having an edge clearance angle of 3° to 5°. A trailing cutting edge 13 is arranged between the corner clearance angle surface 11 and the cutting-edge clearance angle surface 8, which trailing cutting edge 13 adjoins the lower edge 7 of the protective chamfer 5 and the corner clearance angle surface 1 and the cutting-edge clearance angle surface 8, wherein the length of the trailing cutting edge 13 at the lower edge 7 of the protective chamfer 5 is between 0.2 and 1.0 mm. In FIG. 1, the region having a smaller clearance angle is shown with the reference sign 18.

Said cutting insert is used preferably to machine cast materials, composite materials, and steel materials.

The invention claimed is:

1. A cutting insert for installation in carrier tools for machining workpieces, comprising a top side, a bottom side, and side surfaces connecting the top side and the bottom side, wherein a peripheral protective chamfer having an upper edge adjoining the top side of the cutting insert and having a lower edge adjoining the side surfaces is arranged at the transition from the top side to the side surfaces, wherein the upper edge forms cutting edges and cutting corners and, in the region of the cutting edges, the lower edge transitions into the side surfaces that form cutting-edge clearance angle surfaces having an edge clearance angle of 3° to 11°, and wherein, in the region of the cutting corners, the lower edge of the protective chamfer transitions into a corner clearance angle surfaces having an edge clearance angle of 3° to 5°, and wherein a trailing cutting edge is arranged between the corner clearance angle surface and the cutting-edge clearance angle surface, wherein the trailing cutting edge adjoins the lower edge of the protective chamfer and the corner clearance angle surface and the cutting-edge clearance angle surface, and wherein the length of the trailing cutting edge at the lower edge of the protective chamfer is between 0.2 and 1.0 mm.

2. The cutting insert according to claim 1, wherein the corner radius lies between 0.2 and 3.2 mm.

3. The cutting insert according to claim 1, wherein the length of the trailing cutting edge at the lower edge of the protective chamfer is between 0.4 and 0.8 mm.

4. The cutting insert according to claim 3, wherein the transition of the corner clearance angle surface to the trailing cutting edge is designed as a radius transition or as a tangent between the corner radius and the cutting insert edge at the top side of the cutting insert.

5. The cutting insert according to claim 1, wherein the cutting insert has at least three cutting corners.

6. The cutting insert according to claim 1, comprising a rake face on the top side, wherein a first circular clamping recess is arranged on the rake face, which first clamping recess has a spherical or circular elevation in the center, the tip of which lies below the rake face.

7. The cutting insert according to claim 6, wherein a second clamping recess is arranged coaxial to the first clamping recess, wherein the first clamping recess is arranged deeper than the second clamping recess and both clamping recesses are arranged deeper than the rake face.

8. The cutting insert according to claim 1, wherein the cutting insert is composed of ceramic or CBN or is face-laminated, edge-laminated, or corner-tipped with these materials.

9. The use of a cutting insert according to claim 1 to machine cast materials, composite materials, or steel materials.

10. The cutting insert according to claim 1, wherein the corner clearance angle surfaces have an edge clearance angle smaller than the edge clearance angle of the cutting-edge clearance angle surfaces.

11. The cutting insert according to claim 1, wherein the length of the trailing cutting edge at the lower edge of the protective chamfer is 0.5 mm.

12. The cutting insert according to claim 1, wherein the corner radius lies between 0.4 and 1.2 mm.

13. The cutting insert according to claim 1, wherein the corner radius is 0.8 mm.

14. The cutting insert according to claim 1, wherein the cutting insert has three cutting corners.

\* \* \* \* \*